(12) United States Patent
Barcock et al.

(10) Patent No.: US 8,978,250 B2
(45) Date of Patent: Mar. 17, 2015

(54) ARTICLE AND METHOD OF MANUFACTURE THEREOF

(75) Inventors: Carl Lee Barcock, Derby (GB); Michael Lawrence Carlisle, Derby (GB); Ian Murray Garry, Leicestershire (GB); Daniel Clark, Derby (GB); Gemma Louise Young, Staffordshire (GB)

(73) Assignee: Rolls-Royce PLC, London (GB)

( * ) Notice: Subject to any disclaimer, the term of this patent is extended or adjusted under 35 U.S.C. 154(b) by 1249 days.

(21) Appl. No.: 12/423,103

(22) Filed: Apr. 14, 2009

(65) Prior Publication Data
US 2009/0258168 A1    Oct. 15, 2009

(30) Foreign Application Priority Data
Apr. 15, 2008  (GB) .................................. 0806768.8

(51) Int. Cl.
| | |
|---|---|
| F01D 5/16 | (2006.01) |
| F16F 1/37 | (2006.01) |
| B22F 3/105 | (2006.01) |
| B22F 5/10 | (2006.01) |
| B29C 67/00 | (2006.01) |
| B29L 31/00 | (2006.01) |

(52) U.S. Cl.
CPC .................. *F16F 1/37* (2013.01); *B22F 3/1055* (2013.01); *B22F 5/10* (2013.01); *B29C 67/0051* (2013.01); *B29L 2031/721* (2013.01)

USPC .................. 29/889.2; 29/889.5; 29/419.1

(58) Field of Classification Search
CPC .......... B21K 3/04; B23P 15/006; B23P 15/02
USPC ............ 29/889.2, 889.5, 407.07, 419.1, 422, 29/557, 889.72, 889.7; 427/596
See application file for complete search history.

(56) References Cited

U.S. PATENT DOCUMENTS

| | | | | |
|---|---|---|---|---|
| 2,984,453 | A * | 5/1961 | Heymann .................. | 416/229 R |
| 6,269,540 | B1 * | 8/2001 | Islam et al. .................. | 29/889.7 |
| 6,547,049 | B1 * | 4/2003 | Tomlinson .................... | 188/379 |
| 6,736,423 | B2 * | 5/2004 | Simonian et al. ............. | 280/731 |
| 6,756,561 | B2 * | 6/2004 | McGregor et al. ........ | 219/121.64 |
| 2002/0041818 | A1 * | 4/2002 | Abe et al. .......................... | 419/7 |
| 2005/0023719 | A1 | 2/2005 | Nielsen et al. | |
| 2005/0074596 | A1 | 4/2005 | Nielsen et al. | |
| 2007/0007260 | A1 * | 1/2007 | Steinhardt ................ | 219/121.64 |

FOREIGN PATENT DOCUMENTS

WO    2005054707    6/2005

* cited by examiner

*Primary Examiner* — Christopher Besler
(74) *Attorney, Agent, or Firm* — McCormick, Paulding & Huber LLP

(57) ABSTRACT

A particle damper is formed using a solid freeform manufacturing technique. A filler provides support for the closing wall of the cavity as it is formed. Apertures allow at least a portion of the filler to be removed. A particle fill of between 90 and 95% is achieved either by removing sufficient filler to reach this fill or removing excess filler and re-filling with damping particles.

5 Claims, 2 Drawing Sheets

ARTICLE AND METHOD OF MANUFACTURE THEREOF

CROSS REFERENCE TO RELATED APPLICATION

This application is entitled to the benefit of British Patent Application No. GB 0806768.8, filed on Apr. 15, 2008.

FIELD OF THE INVENTION

This invention relates to articles used for damping and the method of manufacture thereof.

BACKGROUND OF THE INVENTION

Dampers, known as particle vibration dampers are known from U.S. Pat. No. 6,547,049. These dampers comprise a hollow volume filled with particles up to around 95% volume fill. As explained in this patent, the particle vibration damper operates by particle interface contact friction whereby the frictional forces are dependent upon material type and contact forces, the contact forces being governed by the vibratory accelerations of the wall. Under specific vibrations a particle will attempt to migrate through the vibration damper device in a direction that is generally parallel to the polar axis and competes with the other particles for their migratory position. Three analogous phases of movement may be identified: solid, liquid and gas, with each phase being dependent on the volume fill of the chamber with the particles. The gas phase can only occur if the particles can behave like molecules in a gas, which, in most embodiments, is significantly below 95% fill. The fluid phase of motion is where the particles "fluidise" and the motion of the particles are similar to a viscous liquid; at least one free surface is required. The solid phase is where the particles migrate around the chamber without colliding or fluidising and requires almost a full volume fill. The most effective damping region is the boundary between the solid and fluid phase usually around a 90-98% fill. Vibratory energy is dissipated by the inter-particle frictional forces thus providing damping to vibrations.

Particle dampers of this type are usually separate containers attached to a surface of the component to be damped. Where the outside form of the component is important for perhaps aerodynamic, thermal or geographic reasons, such particle dampers may be difficult to use. Additionally, the method of attaching the damper limits the locations of the component on which the damper may be placed. Many components have an optimum damping location and if this location is inaccessible for placement of the damper, larger, heavier and less efficient dampers may be necessary at other, more accessible, locations of the component.

Solid freeform fabrication (SFF) techniques are methods, which allow the manufacture of solid objects by sequential delivery of energy and/or material to specified locations to produce that object. SFF is sometimes referred to as rapid prototyping, rapid manufacture, layered manufacturing and additive manufacture.

A number of techniques are known in the art including: three-dimensional printing using an inkjet-like printhead to deposit phase change material in layers, stereolithography which uses a laser to cure liquid photopolymers, fused deposition modelling which extrudes hot plastic through a nozzle, Direct Laser Deposition (DLD) where a laser is used to melt metal from a wire or powder and deposit it on the part directly, and Selective Laser Sintering (SLS) or powder bed processing which uses a laser or other heat source to fuse powdered nylon, elastomer or metal layered in a bed of the material.

In Direct Laser Deposition is a melt pool is formed in a substrate and a feedstock, typically a metal powder, is directed into the melt pool and allowed to solidify by traversing the heat source away from the deposition location. By repeated melting and deposition at the same location it is possible to create quite complex structures.

One technique for manufacturing complex three-dimensional shapes is described in U.S. Pat. No. 6,656,409. A laser is used as the heat source to simultaneously heat the deposition substrate and a powder feedstock. The laser beam is focused to provide a high irradiance area at or near the surface on which the deposition is to occur. At or near the deposition region the powder feedstock material intersects the laser beam and becomes molten to create a new layer of material on the substrate.

SUMMARY OF THE INVENTION

It is an object of the present invention to seek to provide an improved damper component and a method of making the damper component.

According to a first aspect of the invention there is provided a method of forming a particle vibration damper, the method including the steps of providing a cavity by a method of solid freeform fabrication, the cavity having a filler material and at least one aperture through which at least some of the filler material may be removed, partially removing the filler material through at least one of the apertures, and closing the or each aperture.

Preferably, the cavity has a plurality of apertures.

The method of manufacture may have further steps including the step of adding damping particles to the cavity through at least one of the apertures after at least some of the filler material is partially removed and before the or each aperture is closed.

Preferably, the filler material comprises particles.

The volume fill of filler material and damping particles may be between 90 and 98% of the cavity volume.

With the present invention, the method of manufacture can create cooling channels that can actively control the thermal condition by flowing a fluid through them and can be used for rapid cooling of injection molds.

In the aspect of the invention preferably the at least one aperture is closed by solid freeform fabrication.

The filler may be removed by a method selected from the group: blowing, leaching or dissolving.

According to a second aspect of the invention there is provided a method of forming a damped component that includes the step of providing a component with a particle vibration damper.

Preferably, the component is formed from solid freeform fabrication.

Preferably, the component is a turbine engine component.

Preferably, the turbine engine component is a combustor or combustor injector.

Preferably, the component is provided with multiple cavities.

DETAILED DESCRIPTION OF THE PREFERRED EMBODIMENTS

In a first embodiment the article 2, which may be an article used in a turbine engine, is formed or partly formed using a direct manufacturing technique such as direct laser deposition. The article may be a fuel injector or combustor casing or other appropriate component that requires vibration damping.

The article 2 is formed in a layerwise manner using a deposition head. The preferred deposition head can deliver a high-energy beam, typically a laser beam, and a feedstock, typically powder, to a substrate. The deposition head is mounted to a movement means such as a robotic arm and can traverse over the substrate in a pre-programmed path.

As the deposition head traverses over the substrate in the pre-programmed path the laser selectively melts a portion of the substrate and forms a melt pool. Powder is directed from the deposition head into the melt pool and is melted either in the melt pool or by the heat of the laser. Once the laser has traversed from the melt pool the deposited powder is allowed to cool and solidify to form a deposit having a height. By repeated traverses of the deposition head over the same locations of the substrate it is possible to build quite tall structures 2.

In the preferred embodiment, the head path is set and the head operation controlled such that powder is continuously deposited to the substrate. The laser may be selectively operated such that melt pools are formed at certain locations of the substrate but not at other locations. This operation results in portions of the layers that have particles that are not fused 4 and portions of the layers that are fused and solidified.

Figure 1:
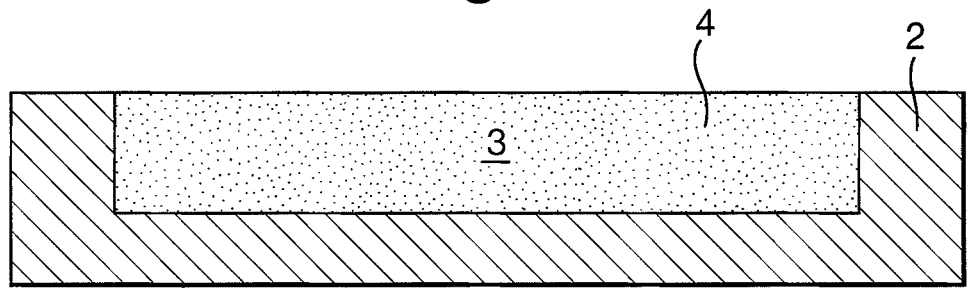
FIG. 1 is a simplified schematic illustration of an article that may be used in a turbine engine and is made in accordance with a method provided by the present invention.
Figure 2:
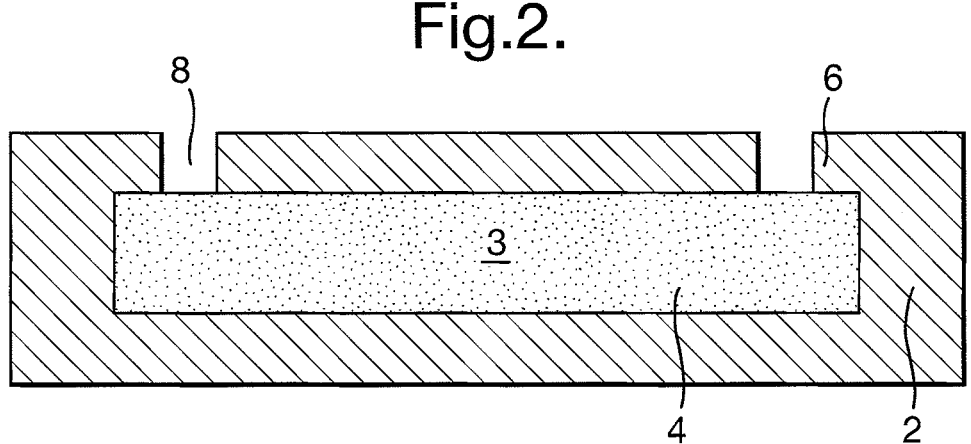
FIG. 2 is a simplified schematic illustration of the article of FIG. 1 illustrating a second step of the method of fabrication of FIG. 1.
Figure 3:
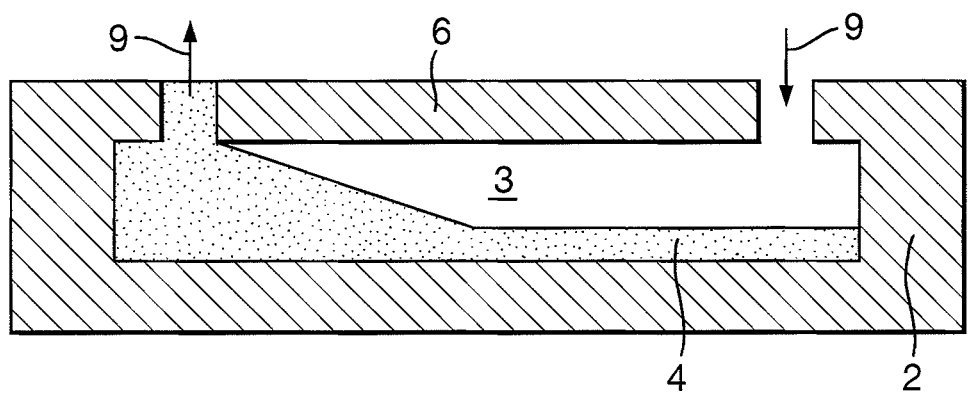
FIG. 3 is a simplified schematic illustration of the article of FIG. 1 illustrating a third powder-filling step of the method of fabrication shown in FIG. 1.

As depicted in FIG. 1, after a series of layers it is possible to build an enclosure filled with particles that is bounded by walls. The benefit of filling the enclosure with particles is that it is possible to use these particles to deposit a closing wall 6 thereon. As shown in FIG. 2, apertures 8 are formed in the top wall of the enclosure during deposition of the wall to allow the powder particles to be removed from the enclosure. Whilst the embodiment suggests that apertures should be formed in the closing wall 6, the method of manufacture may permit apertures to be formed in any of the other walls instead.

The apertures permit the un-melted powder particles to be removed from the enclosure 3 by blowing a gas indicated by arrow 9 through the enclosure. The particles are entrained in the gas flow and carried from the enclosure. It is possible, if desired, to collect the powder and re-use it as feedstock at a later stage.

The use of the powder is preferred as it has the same compositional make up as the walls of the chamber. Thus, when the laser directly melts an upper portion of the powder, the powder that forms part of the closing wall 6 and will not contaminate the rest of the article. The powder is also preferred is it has a relatively small size—typically with a diameter between 10 µm and 150 µm—and can therefore be easily entrained in the gas flow used to evacuate the chamber.

Although the particles are described as being deposited during manufacture of the enclosure it is of course possible to fill the enclosure before the closing wall is formed. The fill can be performed simply by pouring appropriate particles into the cavity and levelling to provide the surface onto which the closing wall is formed.

Once the closing wall formed and the chamber evacuated it is possible to provide an appropriate fill of particles to tune the damper to be able to damp the required frequency. For most applications, as described above, this lies between a 90 to 98% volume fill. Other volume fills may be desirable according to the application of use.

Figure 4:
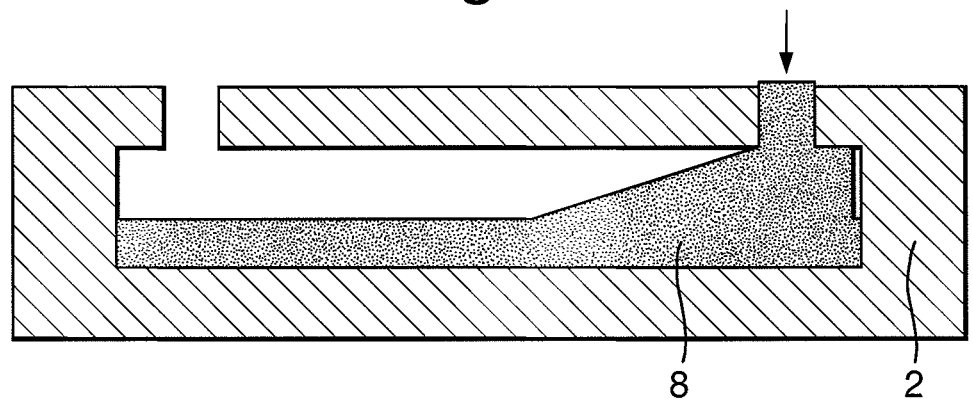
FIG. 4 is a simplified schematic illustration of the article of FIG. 1 illustrating a fourth step in the fabrication process of FIG. 1.

In the majority of applications it will be necessary to partially or completely remove the support powder from the enclosure that is subsequently filled with new particles that are sized to achieve the desired damping function, as shown in FIG. 4. In some applications, however, the powder may be of an appropriate size to achieve the required damping in which case once the volume fill has been reduced to an appropriate level no further particles need be added.

Figure 5:
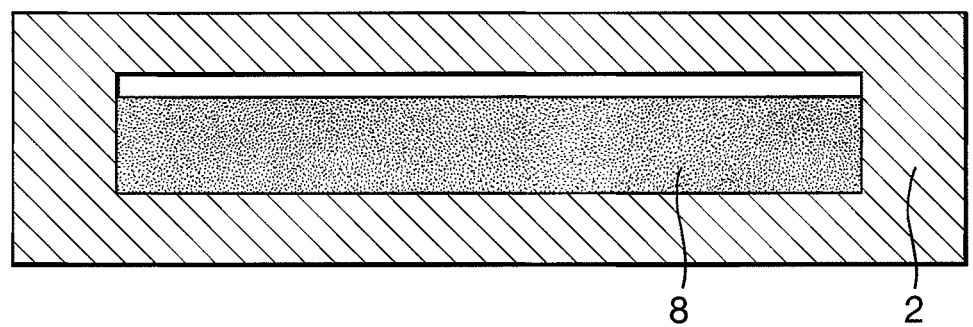
FIG. 5 is a simplified schematic illustration of the article of FIG. 1 illustrating a aperture closing step used by the method shown in FIG. 1.

Once the correct volume fill is achieved the apertures in the closing wall are plugged to form the damping chamber as depicted in FIG. 5. If the aperture is to be closed by DLD the aperture is closed using a tool path that skirts the periphery of the hole. By repeated passes, the aperture size is reduced until closed. Where plugs are used these can be welded in place using a laser or through friction welding.

Whilst the method has been described with respect of using powder to support the deposition of the closing wall it is not necessary to use this method. Provided the support material can be removed through the apertures, e.g., by dissolving, leaching, sublimation, melting or another appropriate technique, it is possible to use other materials.

In some circumstances it may be necessary to use a combination of techniques to form and evacuate the chamber. For example, a lower layer of a dissolvable resin or functional equivalent may be used to partially fill the chamber onto which powder particles may be supplied before the closing wall is formed. Such a process can allow the resin to be removed first, which will generate a greater open space within the chamber free of particles, which improves the opportunity for the powder particles to be entrained in the gas flow.

Alternatively, the damping particles may be added to the enclosure during or after formation of the enclosure and an optional layer of the feedstock powder added over the damping particles before the closing wall is formed. Beneficially, this enables a wider choice of damping particle shape and size. Geometric shapes of a size which otherwise would not fit through the apertures may be used. These shapes can be more efficient at damping than simple spherical particles and can have the form selected from one or more of discs, rods, cones, lozenge or dog bone in addition to spheres at no extra cost to the process.

Once the cavity is closed the chambers will act to damp vibrations at a frequency determined by the volume fill and damping particle size or shape. Further deposition layers may be added to the closing wall such that the damping chambers may be located at the optimum position within the component rather than added to a compromise position on the periphery. In doing so the total cost, weight and part count are minimised.

The enclosure or cavity may be formed by techniques other than Solid Freeform Fabrication. For example they may be cast using a conventional lost wax process. The wax acts both as filler material around which the cavity is formed. The wax may also be used to form the apertures, which allow the wax filler to be removed by high temperature processing. Alternatively, the apertures may be formed by drilling or punching a hole into the cavity through one of the cavity walls.

A component incorporating the above described particle damper may have multiple cavities.

It will be appreciated that by using the filler material of the particle damper as the damping media then manufacturing can be simplified. The filler material can be deposited whilst the cavity is formed and does not require an additional step to add it at a later stage. The filler material can be used to provide a surface onto which a closing wall can be deposited leaving an aperture through which some particles can be removed—leaving some behind. This can avoid the requirement to add damping particles into the chamber through the apertures.

It will be further appreciated that more appropriately shaped damping particles which give a greater damping efficiency of a size greater than that of the aperture can be put into the chamber to provide a surface onto which a closing wall can be deposited before some of the filler, which may not be the damping particles, is removed through an aperture to provide an appropriate volume fill.

It will be further appreciated that the described method enables components to be built with integral dampers without the external forms of the components being affected.

What is claimed is:

1. A method of forming a particle vibration damper, the method including the steps of:

providing a cavity by depositing at least one layer of a particulate filler material, and fusing a portion of the particulate filler material such that the cavity is provided and is formed of fused particulate filler material and contains unfused particulate filler material, the cavity having at least one aperture through which at least some of the unfused particulate filler material may be removed;

partially removing the unfused particulate filler material through at least one of the apertures; and closing the aperture or apertures, such that after closure of the aperture or apertures the cavity has a 90% to 98% volume fill of the unfused particulate filler material.

2. A method according to claim 1, wherein the cavity has a plurality of apertures.

3. A method according to claim 1, further comprising a step of adding damping particles to the cavity through at least one of the apertures after the particulate filler material is partially removed and before the aperture or apertures are closed.

4. A method according to claim 3, wherein a volume fill of particulate filler material and damping particles is between 90 and 98% of the cavity volume after closure of the aperture or apertures.

5. A method according to claim 1, wherein the at least one aperture is closed by solid freeform fabrication.

* * * * *